(12) United States Patent
Velazco

(10) Patent No.: US 12,095,508 B2
(45) Date of Patent: Sep. 17, 2024

(54) MULTI-LINK OPTICAL TERABIT TERMINAL

(71) Applicant: CALIFORNIA INSTITUTE OF TECHNOLOGY, Pasadena, CA (US)

(72) Inventor: Jose E. Velazco, Altadena, CA (US)

(73) Assignee: CALIFORNIA INSTITUTE OF TECHNOLOGY, Pasadena, CA (US)

( * ) Notice: Subject to any disclaimer, the term of this patent is extended or adjusted under 35 U.S.C. 154(b) by 204 days.

(21) Appl. No.: 17/894,847

(22) Filed: Aug. 24, 2022

(65) Prior Publication Data

US 2023/0091751 A1 Mar. 23, 2023

Related U.S. Application Data

(60) Provisional application No. 63/246,892, filed on Sep. 22, 2021.

(51) Int. Cl.
*H04B 10/29* (2013.01)
*G02B 26/08* (2006.01)

(52) U.S. Cl.
CPC ......... *H04B 10/29* (2013.01); *G02B 26/0816* (2013.01); *G02B 26/0875* (2013.01)

(58) Field of Classification Search
CPC ............... H04B 10/29; G02B 26/0816; G02B 26/0875
USPC ....................................................... 398/121
See application file for complete search history.

(56) References Cited

U.S. PATENT DOCUMENTS

| | | |
|---|---|---|
| RE32,521 E | 10/1987 | Fergason |
| 4,824,245 A | 4/1989 | Gardner et al. |
| 4,975,926 A | 12/1990 | Knapp |
| 5,539,393 A | 7/1996 | Barfod |
| 5,724,168 A | 3/1998 | Oschmann et al. |
| 5,757,528 A | 5/1998 | Bradley et al. |
| 5,880,867 A | 3/1999 | Ronald |
| 6,424,442 B1 | 7/2002 | Gfeller et al. |
| 6,788,898 B1 | 9/2004 | Britz et al. |
| 7,873,278 B2 | 1/2011 | Baiden |
| 7,953,326 B2 | 5/2011 | Farr et al. |

(Continued)

FOREIGN PATENT DOCUMENTS

DE 102022123727 A1 3/2023

OTHER PUBLICATIONS

Li et al; High-Capacity Free-Space Optical Communications Between a Ground Transmitter and a Ground Receiver via a UAV Using Multiplexing of Multiple Orbital Angular-Momentum Beams; Dec. 2017; Nature.com; pp. 1-12. (Year: 2017).*

Li et al; High-capacity free space optical communications between a transmitter and a ground receiver via a UAV using multiplexing of multiple orbital Angular momentum beams; Dec. 2017; Nature. com; pp. 1-12. (Year: 2017).*

(Continued)

*Primary Examiner* — Amritbir K Sandhu
(74) *Attorney, Agent, or Firm* — Steinfl + Bruno LLP

(57) ABSTRACT

Multiple-link optical terabit terminals (MLOTT) allowing high speed data transfer rates in terabit per second range in an omnidirectional fashion are disclosed. The described terminals have multifaceted structure, provide full coverage, implement single laser or laser arrays, and single detector or detector arrays to achieve higher transmission rates. Wavelength division multiplexing schemes can also be used when implementing the disclosed terminals for higher data rates. Steerable mirrors and lenses can be implemented as part of the terminals and based on angle-of-arrival calculations performed in real time.

15 Claims, 13 Drawing Sheets

(56) References Cited

U.S. PATENT DOCUMENTS

| | | | |
|---|---|---|---|
| 9,438,338 | B1 | 9/2016 | Chan et al. |
| 9,455,787 | B2 | 9/2016 | Byers et al. |
| 9,515,729 | B2 | 12/2016 | Murshid et al. |
| 10,581,525 | B2* | 3/2020 | Velazco ............... H04B 10/66 |
| 10,707,966 | B2* | 7/2020 | Velazco ............ H04B 10/1129 |
| 11,616,574 | B2* | 3/2023 | Velazco ................. H01Q 3/30 398/113 |
| 2001/0043379 | A1 | 11/2001 | Bloom et al. |
| 2003/0117623 | A1 | 6/2003 | Tokhtuev et al. |
| 2006/0239689 | A1 | 10/2006 | Ashdown |
| 2007/0127926 | A1 | 6/2007 | Marioni et al. |
| 2009/0009391 | A1 | 1/2009 | Fox et al. |
| 2010/0034540 | A1 | 2/2010 | Togashi |
| 2010/0054746 | A1 | 3/2010 | Logan |
| 2010/0254711 | A1 | 10/2010 | Miller |
| 2010/0260503 | A1 | 10/2010 | Zhovnirovsky et al. |
| 2012/0206913 | A1 | 8/2012 | Jungwirth et al. |
| 2012/0275796 | A1 | 11/2012 | Yokoi |
| 2013/0223846 | A1 | 8/2013 | Joseph et al. |
| 2014/0003817 | A1 | 1/2014 | Roberts et al. |
| 2014/0248058 | A1 | 9/2014 | Simpson et al. |
| 2014/0270749 | A1 | 9/2014 | Miniscalco et al. |
| 2014/0294399 | A1* | 10/2014 | Makowski ........... H04B 10/118 398/126 |
| 2014/0376001 | A1 | 12/2014 | Swanson |
| 2015/0009485 | A1 | 1/2015 | Mheen et al. |
| 2015/0110491 | A1* | 4/2015 | Gayrard ................ H04B 10/11 398/79 |
| 2015/0125157 | A1* | 5/2015 | Chao .................... H04B 10/118 398/122 |
| 2015/0282282 | A1 | 10/2015 | Breuer et al. |
| 2015/0298827 | A1 | 10/2015 | Nguyen et al. |
| 2015/0372769 | A1 | 12/2015 | Farr et al. |
| 2016/0043800 | A1* | 2/2016 | Kingsbury ......... H04B 7/18513 398/125 |
| 2016/0173199 | A1 | 6/2016 | Gupta et al. |
| 2016/0204866 | A1* | 7/2016 | Boroson ................ H04B 10/61 398/97 |
| 2016/0226584 | A1 | 8/2016 | Chalfant, III |
| 2017/0054503 | A1 | 2/2017 | Pescod et al. |
| 2017/0264365 | A1* | 9/2017 | Takahashi ............ H04B 10/548 |
| 2018/0003837 | A1 | 1/2018 | Morris et al. |
| 2018/0102843 | A1 | 4/2018 | Wang |
| 2018/0122978 | A1 | 5/2018 | Khatibzadeh et al. |
| 2018/0191431 | A1 | 7/2018 | Moision et al. |
| 2019/0122593 | A1 | 4/2019 | Guillama et al. |
| 2019/0229805 | A1* | 7/2019 | Velazco ............... H04B 10/503 |
| 2019/0349087 | A1 | 11/2019 | Velazco |
| 2020/0366371 | A1* | 11/2020 | Tempone ........... H04B 10/1123 |
| 2021/0306071 | A1 | 9/2021 | Velazco |
| 2023/0084166 | A1* | 3/2023 | Searcy ................ H04B 10/118 343/702 |

OTHER PUBLICATIONS

Aguilar, A. C., et al., "Simultaneous Optical Links with the Inter-Satellite Omnidirectional Optical Communicator," in *IEEE Aerospace Conference Proceedings*, 2020. 9 Pages.

Alexander, J., et al., "Scientific Instrumentation of the Radio-Astronomy-Explorer-2 Satellite," *Astron. & Astrophys.* vol. 40, No. 4, pp. 365-371, 1975. 8 Pages.

Boyraz, O., et al., "Omnidirectional Inter-Satellite Optical Communicator (ISOC), ISOC Enables Gigabit Communication Between CubeSats", available at https://ntrs.nasa.gov/search.jsp?R=20180002972 Mar. 3, 2017. 2 pages.

De Kok, M., et al., "CubeSat Array for Detection of RF Emissions from Exoplanet using Inter Satellites Optical Communicators," in *IEEE Aerospace Conference Proceedings*, 2020. 13 Pages.

Non-Final Office Action for U.S. Appl. No. 1616/394,695, filed Apr. 25, 2019 on behalf of California Institute of Technology. Mail date: Jan. 15, 2020. 15 Pages.

Non-Final Office Action for U.S. Appl. No. 16/218,394, filed Dec. 12, 2018 on behalf of California Institute of Technology. Mail Date: Sep. 13, 2019. 24 pages.

Non-Final Office Action issued for U.S. Appl. No. 17/184,446, filed Feb. 24, 2021, on behalf of California Institute of Technology. Mail Date: Jul. 8, 2022. 27.

Notice of Allowability for U.S. Appl. No. 17/184,446, filed Feb. 24, 2021, on behalf of California Institute of Technology, Mailed Date: Jan. 10, 2023, 5 pages.

Notice of Allowance for U.S. Appl. No. 17/184,446, filed Feb. 24, 2021, on behalf of California Institute of Technology, Mailed Date: Dec. 21, 2022. 9 pages.

Notice of Allowance for U.S. Appl. No. 1616/394,695 filed on Apr. 25, 2019 on behalf of California Institute of Technology. Mail date: Apr. 29, 2020. 6 Pages.

Notice of Allowance for U.S. Appl. No. 16/218,394, filed Dec. 12, 2018 on behalf of California Institute of Technology. Mail Date: Jan. 7, 2020. 11 Pages.

Velazco et al. "High data rate inter-satellite Omnidirectional Optical Communicator", 32nd Annual AIAA/USU Conference on Small Satellites, Aug. 4-9, 2018. 5 pages.

Velazco, J. E., et al., "Inter-satellite omnidirectional optical communicator for remote sensing," *SPIE Opt. Eng. + Appl.*, vol. 10769, 2018. 8 Pages.

Velazco, J. E., et al., "Q4—a CubeSat Mission to Demonstrate Omnidirectional Optical Communications," in *IEEE Aerospace Conference Proceedings*, 2020. 7 pages.

Velazco, J. E., "Omnidirectional Optical Communicator," in *IEEE Aerospace Conference Proceedings*, 2019, pp. 1-6. 7 Pages.

Velazco, J., et al., "An Inter Planetary Network Enabled by SmallSats" IEEE AerospaceConference, Aug. 2020—ieeexplore.ieee.org. Available online from https://trs.jpl.nasa.gov/bitstream/handle/2014/51134/CL%2320-0063.pdf?sequence=1. 10 Pages.

* cited by examiner

MULTI-LINK OPTICAL TERABIT TERMINAL

CROSS REFERENCE TO RELATED APPLICATIONS

The present application claims priority to U.S. Provisional Patent Application No. 63/246,892 filed on Sep. 22, 2021 incorporated herein by reference in its entirety. The present application may be related to US Patent Application Publication No. US 2021/0306071 A1, published on Sep. 30, 2021, also incorporated herein by reference in its entirety.

STATEMENT OF GOVERNMENT GRANT

This invention was made with government support under Grant No. 80NMO0018D0004 awarded by NASA (JPL). The government has certain rights in the invention.

FIELD

The present disclosure is related to optical terminals, and more particularly to multiple-link optical terabit terminals (MLOTT) allowing high speed data transfer rates in the terabit per second range in an omnidirectional fashion.

BACKGROUND

Spacecraft swarms and constellations currently use radiofrequency (RF) signals for both crosslinking and up/down-linking information. It is also expected that the next generation of swarms, constellations and formation flying spacecraft will require multiple simultaneous links to communicate among themselves and with the ground.

As spacecraft sensors' sophistication and demands for higher resolution increase, the amount of data they will collect and capture, will tend to grow exponentially. Sharing this increasingly large amount of data with other spacecraft and with the ground creates a great demand for faster multiple-link data transfer mechanisms. In addition, there are new applications where large amounts of data need to be transferred from the ground to space and back to ground. These applications include but are not limited to the global internet, the internet of things, smart cities, mobile assets, the military, among others.

Data transfer between spacecraft and ground stations is typically achieved using RF signals and as a result, such transfer is limited to speeds of hundreds of megabits per second. As sensor resolution and amount of data continues to improve, the requirements for faster data terminals will continue to increase as well. RF communications may become the bottleneck that limits the amount of data transfer per unit time. Laser communications, using single telescope optical terminals, has promise in providing higher data rates but suffers from beam pointing issues and single link limitations.

In addition, for future terrestrial applications such as wireless communications between cars, high data rate WiFi, direct intra-smartphone communications, etc., there will be a need for a new high data rate, multiple-link communications terminal. These new terminals, in addition to providing multi-gigabit multiple-link connectivity, should also feature reduced size, weight and power (SWaP).

SUMMARY

The disclosed methods and devices address the described needs and provide practical solutions to the above-mentioned issues.

Multiple-link optical terabit terminals (MLOTT) are disclosed. Such terminals implement arrays of strategically positioned optical telescopes to solve the pointing issue of conventional laser communications.

According to a first aspect of the present disclosure, a multiple-link optical terabit terminal (MLOTT) is provided, comprising: A) a multifaceted structure including a plurality of facets arranged in a geometry to provide an omnidirectional coverage, wherein each facet comprises: A.1) a transceiver configured to transmit and receive optical beams; A.2) angle-of-arrival detectors configured to receive an incoming optical beam; A.3) a steerable aperture, and B) a control and processing unit, and wherein a combination of the angle-of-arrival detectors and the control and processing unit is configured to: calculate an angle of arrival of the incoming optical beam and prior to a transmission, to steer the steerable aperture accordingly.

According to a second aspect of the present disclosure, a method of multiple-link omnidirectional communication at terabit rates is disclosed, the method comprising: providing a multifaceted structure including a plurality of facets arranged in a geometry to provide an omnidirectional coverage; providing a laser, a steerable mirror, and a receive focusing lens on each facet of the plurality of facets; providing a plurality of angle-of-arrival (AoA) detectors; receiving an incoming optical beam through the plurality of AoA detectors; calculating an angle of arrival of the incoming optical beam; selecting a facet of the plurality of facets based on the calculated angle of arrival; steering the steerable mirror and the receive focusing lens of the selected facet based on the calculated angle of arrival; activating the laser of the selected facet to generate a transmit optical beam; reflecting the transmit optical beam via the steerable mirror, and receiving the incoming optical beam through receive focusing lens.

Further aspects of the disclosure are provided in the description, drawings and claims of the present application.

DETAILED DESCRIPTION

Figure 1:
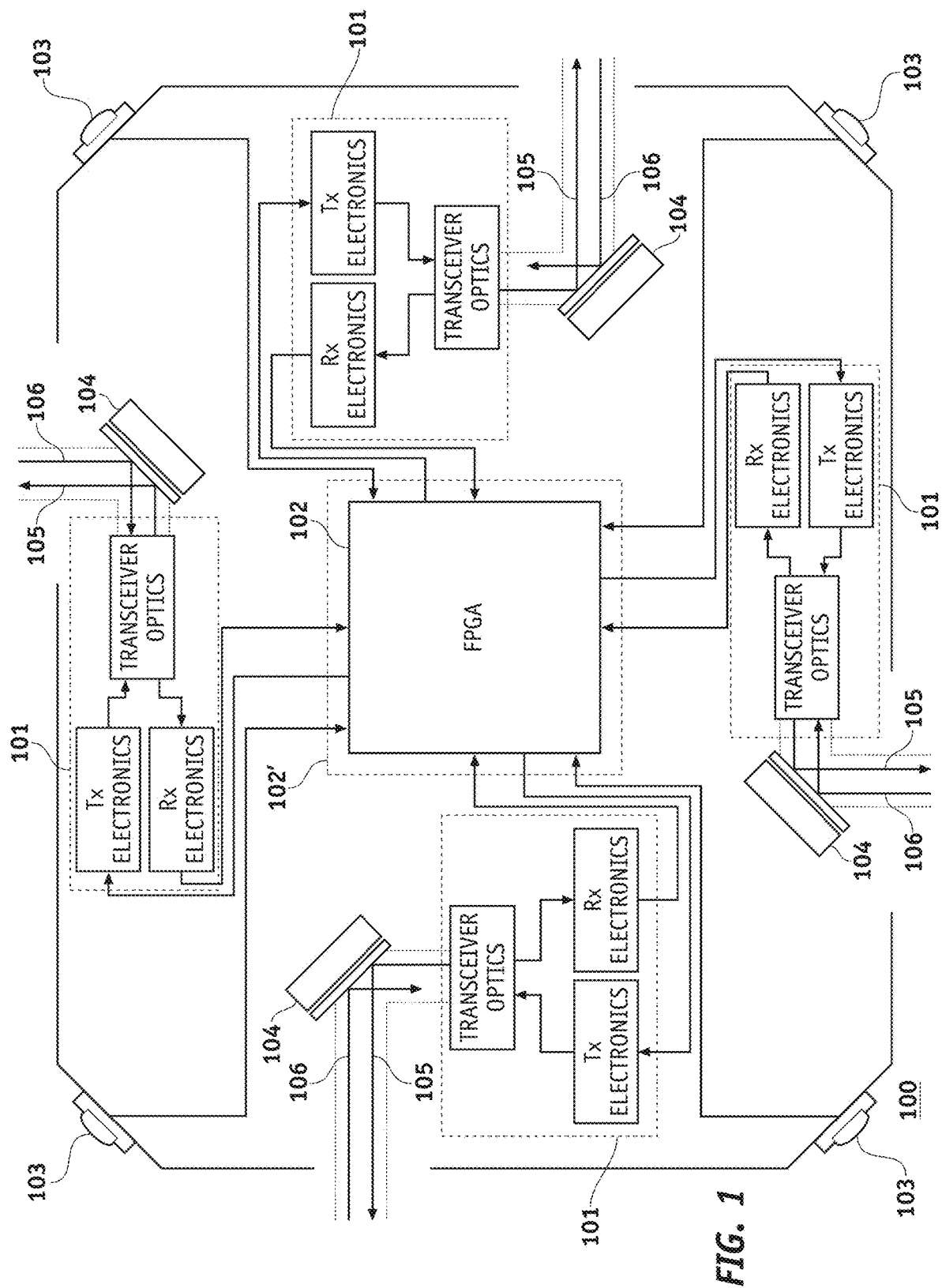
FIG. 1 shows an exemplary Multiple-link optical terabit terminal (MLOTT) according to an embodiment of the present disclosure.

FIG. 1 shows a schematic systems diagram of an exemplary MLOTT (100) according to an embodiment of the present disclosure. MLOTT (100) comprises an array of transceivers (101), an array of angle-of-arrival (AoA) detectors (103), an array of steerable apertures (104), and field programmable gate arrays (FPGA) (102). As also shown, each transceiver (101) may include an optical transceiver together with transmit (Tx) receive (Rx) electronics.

MLOTT (100) of FIG. 1 is configured as a multifaceted device. In this exemplary embodiment, four instances of each transceiver, AoA detector, and steerable aperture are shown, one corresponding to each facet, although in other embodiments in accordance with the teachings of the present disclosure, one or more of each element may be implemented for a desired coverage. As described more in detail later, each optical transceiver within transceivers (101) may include optical elements such as lasers, mirrors, lenses, expanders, optical multiplexers and/or demultiplexers and filters. A combination of such elements is used to generate, transmit and receive beams among various MLOTTs. In an embodiment, steerable aperture (104) may include a mirror, or a lens being held by a mechanical actuator, e.g. a gimbal. Each transceiver (101) includes a laser source (not shown) which is activated, driven and controlled by transmit electronics within each transceiver (101). As will be detailed later, the laser source may include a single laser or a laser array depending on the architecture of the transmit part of the transceiver.

With continued reference to to FIG. 1, each steerable aperture (104) can be used for the transmission and reception of optical signals. The direction and path of each input (reception) and output (transmission) optical signal is indicated by arrows (106, 105), respectively. MLOTT (100) further comprises a control and processing unit (102') including FPGA (102) which is connected to the Tx and Rx electronics of each transceiver (101) to establish bidirectional communication with each transceiver. In addition, FPGA (102) is also connected to the array of AoA detectors (103) via suitable analog-to-digital convertors to receive angle-of-arrival information received from, for example, a pairing MLOTT initiating communication. According to the teachings of the present disclosure, control and processing unit (102') may further include one or more processors and associated electronics (e.g., analog-to-digital convertors, digital-to analog-convertors, I/O pins, etc., not shown).

A network of two or more MLOTTs can be used for the purposes of the present disclosure. By way of example, with further reference to FIG. 1, a first MLOTT may initiate communication with a second MLOTT by transmitting a beam. After receiving such beam, AoA detectors (103) of the second MLOTT provide the AoA information from the first MLOTT to the FPGA (102) of the second MLOTT. FPGA (102) of the second MLOTT then processes the received information for calculation of the angle of arrival of incoming beams which is used to identify the location of the first MLOTT. One of the second MLOTT facets is then selected, and the corresponding laser source of the second MLOTT is then activated and based on the indicated location, the corresponding aperture of the array of steerable apertures (104) is steered to direct the corresponding transceiver (101) of the second MLOTT to transmit beams in the direction of the first MLOTT, thereby establishing a bidirectional communication between the first and the second MLOTT. The AoA mechanism is always active so that it can monitor any changes in AoA to keep the link alive. Depending on the MLOTT's aperture size and distance, transfer rates at near terabit per second speeds can be achieved according to the embodiments of the present disclosure.

Figure 2A:
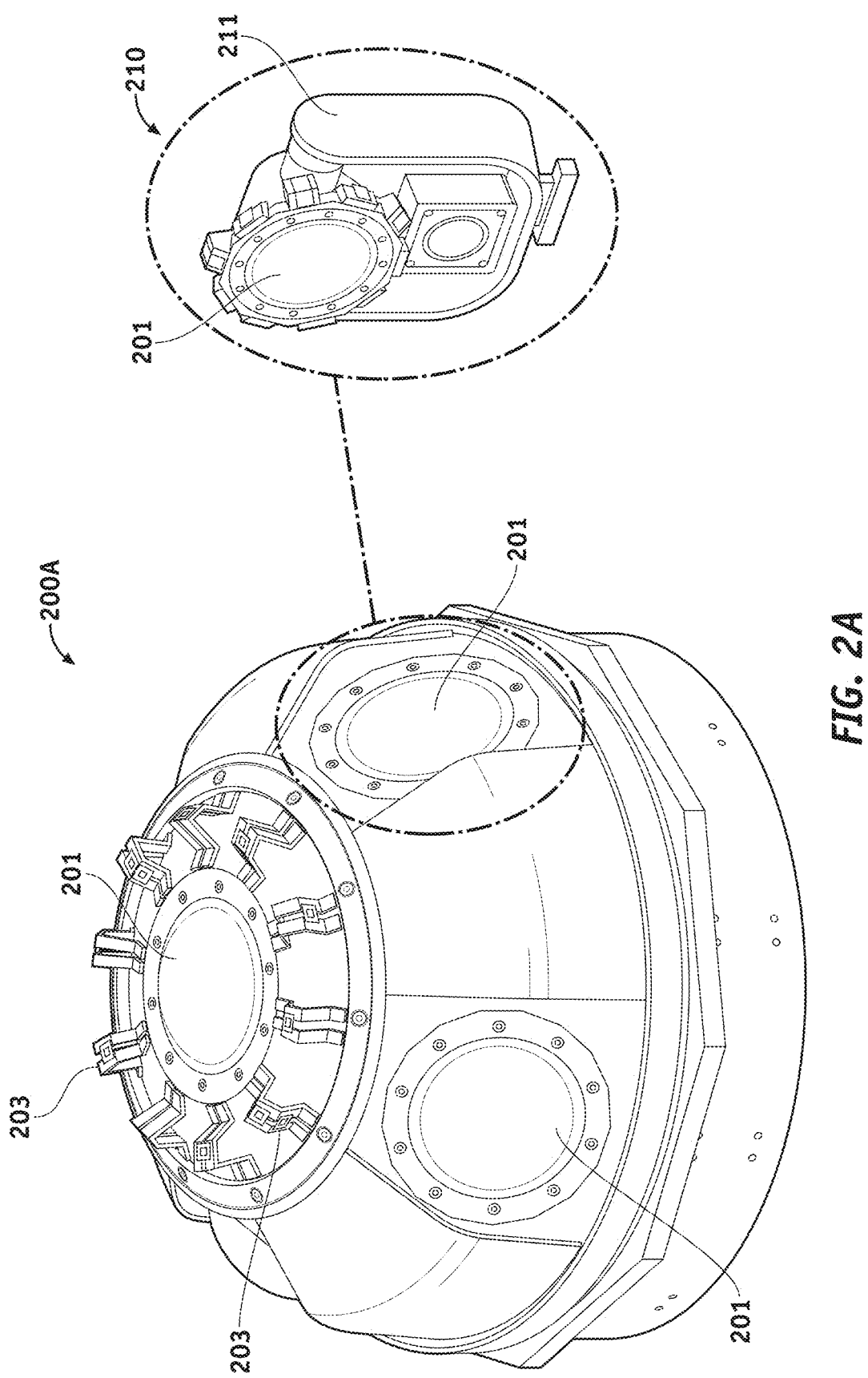
FIG. 2A shows an exemplary MLOTT according to an embodiment of the present disclosure.

FIG. 2A shows an exemplary MLOTT (200A) according to an embodiment of the present disclosure shown in a perspective view (left), with a part of it shown in exploded view (right). MLOTT (200A) has a multifaceted structure representing five apertures (three are visible) for an omnidirectional coverage. Embodiments with a number of apertures other than five may also be envisaged depending on the application and the desired coverage. Also shown are focusing lenses (201) inside the apertures and AoA detectors (203) on top of the apertures. MLOTT (200A) further comprises a fast processor chip (not shown), or an FPGA with a functionality similar to that of FPGA (102) of FIG. 1 and a set of optical transceivers (210, see exploded view to the right) suitably disposed within the device to allow omnidirectional coverage. In an embodiment, optical transceiver (210) may be a gimballed transceiver including a gimbal (211) used to steer the transceiver in both azimuth and elevation (pan and tilt), thereby facilitating orientation of the transceiver (210) towards a desired direction. By virtue of using multifaceted structures combined with large steerable apertures on each facet (e.g., from 2-inch to 10-inch in diameter) an omnidirectional coverage can be achieved at high data rates. As will be described later, using laser arrays and detector arrays as part of the transceivers on each facet, combined with an implementation of wavelength multiplexing schemes, will allow transmission and reception at high data rates in the terabit/sec range.

Figure 2B:
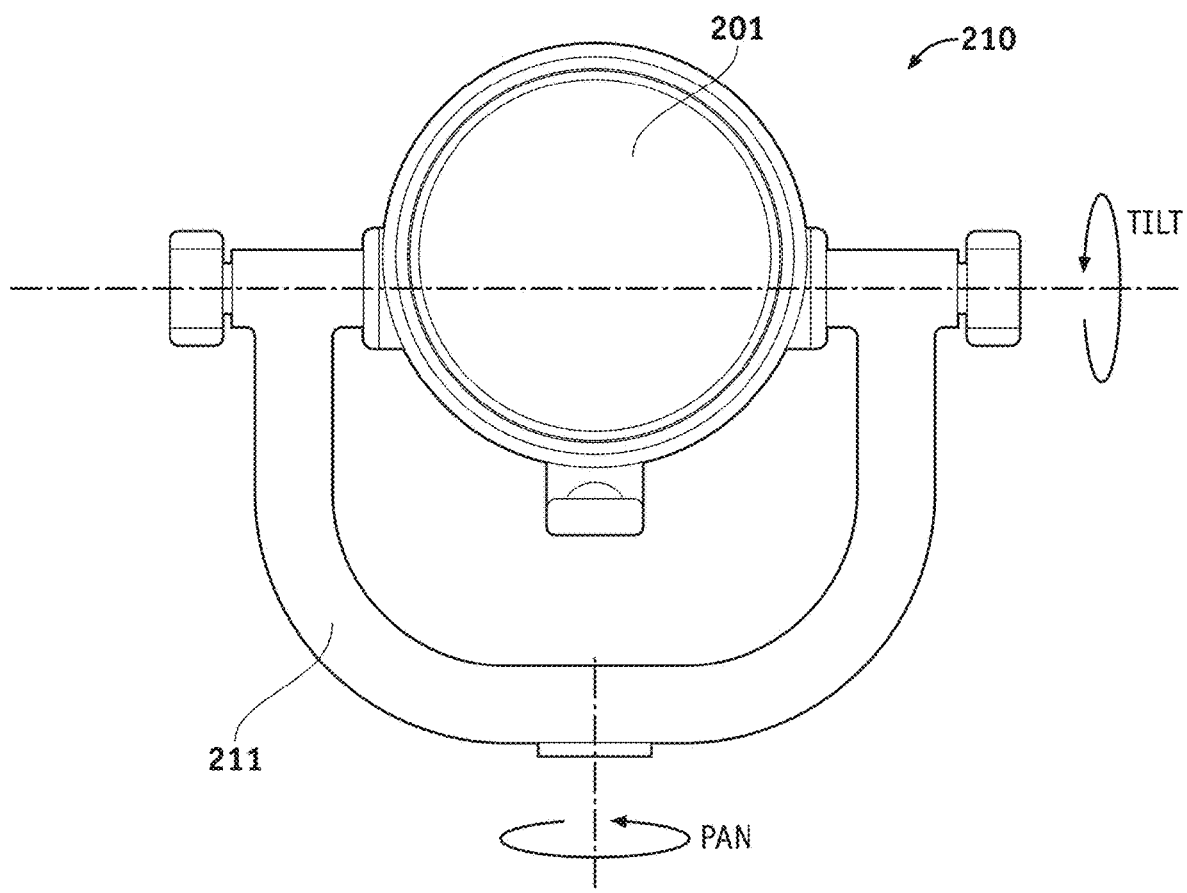
FIG. 2B show a cross section of the MLOTT of FIG. 2A according to an embodiment of the present disclosure.

Upon review of FIGS. 1 and 2B, it can be noted that the MLOTT according to the present disclosure adopts a multifaceted geometry (e.g. five facets as shown in FIG. 2A), where each facet contains steerable optical apertures (lens or mirror) and a transmit steerable laser. Advantageously, the steerable optical apertures allow for steering and for much higher data rates (including phase modulation). In the receive mode, the lenses or mirrors of each facet allow for near terabit data rates by using either multiple wavelengths or phase modulation. If desired or required, transmit and receive geometries can be physically decoupled.

FIG. 2B represents a schematic cross section of transceiver (210) of FIG. 2A wherein focusing lens (201) and gimbal (211) are also shown, together with the gimbal's pan and tilting rotation axes.

Figure 3:
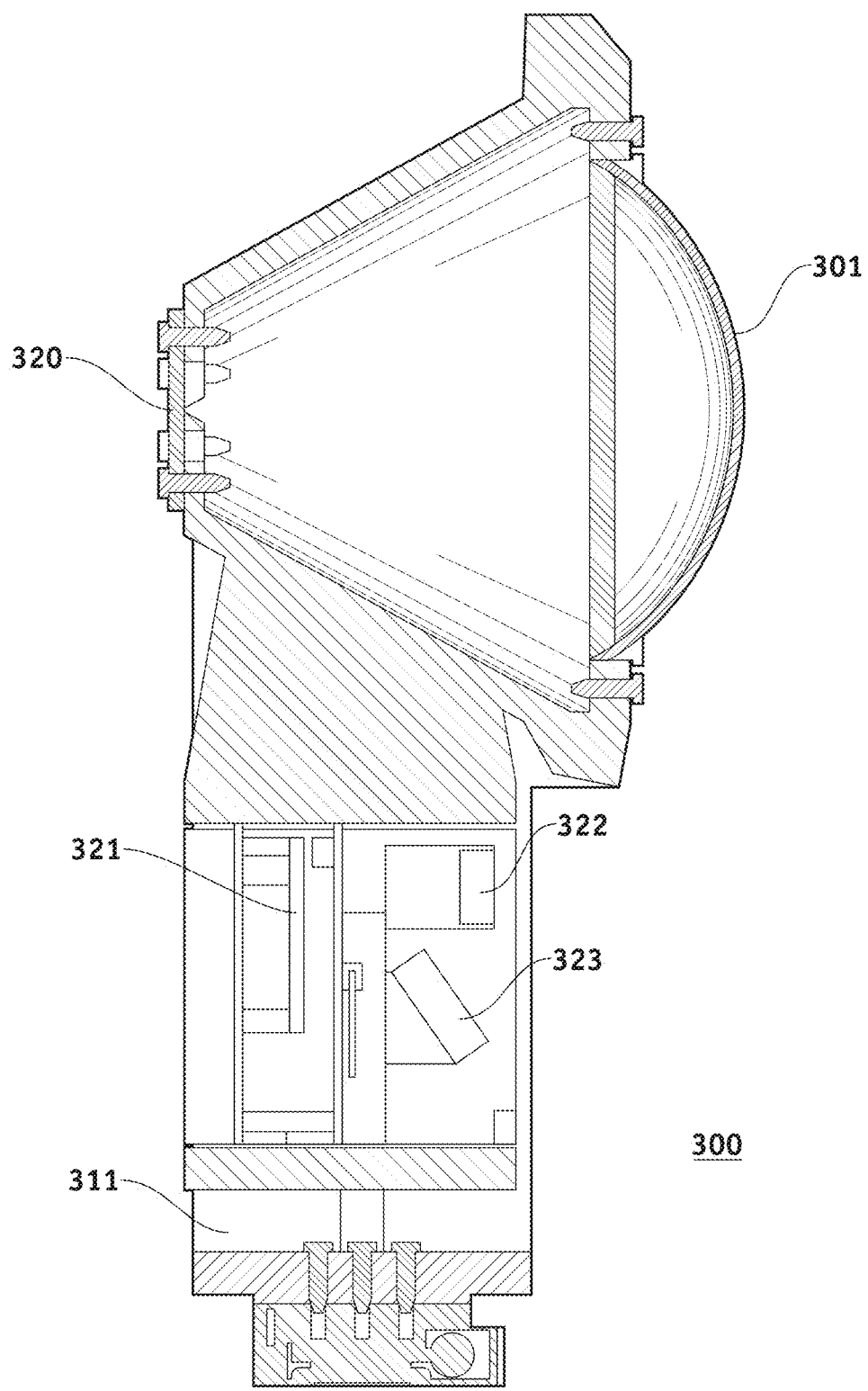
FIG. 3 shows an exemplary MLOTT according to an embodiment of the present disclosure.

FIG. 3 shows a schematic cross-sectional representation of an exemplary MLOTT (300) according to an embodiment of the present disclosure. MLOTT (300) comprises focusing lens (301), fast detection system (320), fast steerable mirror (FSM) (323), FSM electronics (321), gimbal (311), and laser and collimator (322). The collimator may be connected to the laser through fiber or free space. FSM electronics (321) provides the control signal to FSM (323) to ensure that the beam from the laser to be transmitted is oriented properly in the direction of the target. On the receive side, optical focusing lens (301) focuses the received beam at a focal plane where the fast detection system (320) is disposed. Fast detection system (320) may include a fiber inside which the received beam is guided, or a high speed photodetector (not shown) used to directly detect the received optical beam. In an embodiment, MLOTT (300) uses an optical carrier for ultrafast wireless (free space) data transfer. As will be detailed later, the laser may be a single laser or an array of lasers operating at various wavelengths, which are combined into single beam by a multiplexer. In an embodiment, shown in the figure, the focusing lens (301) and FSM (323) are held by a mechanical actuator, e.g. gimbal (311).

Figure 4A:
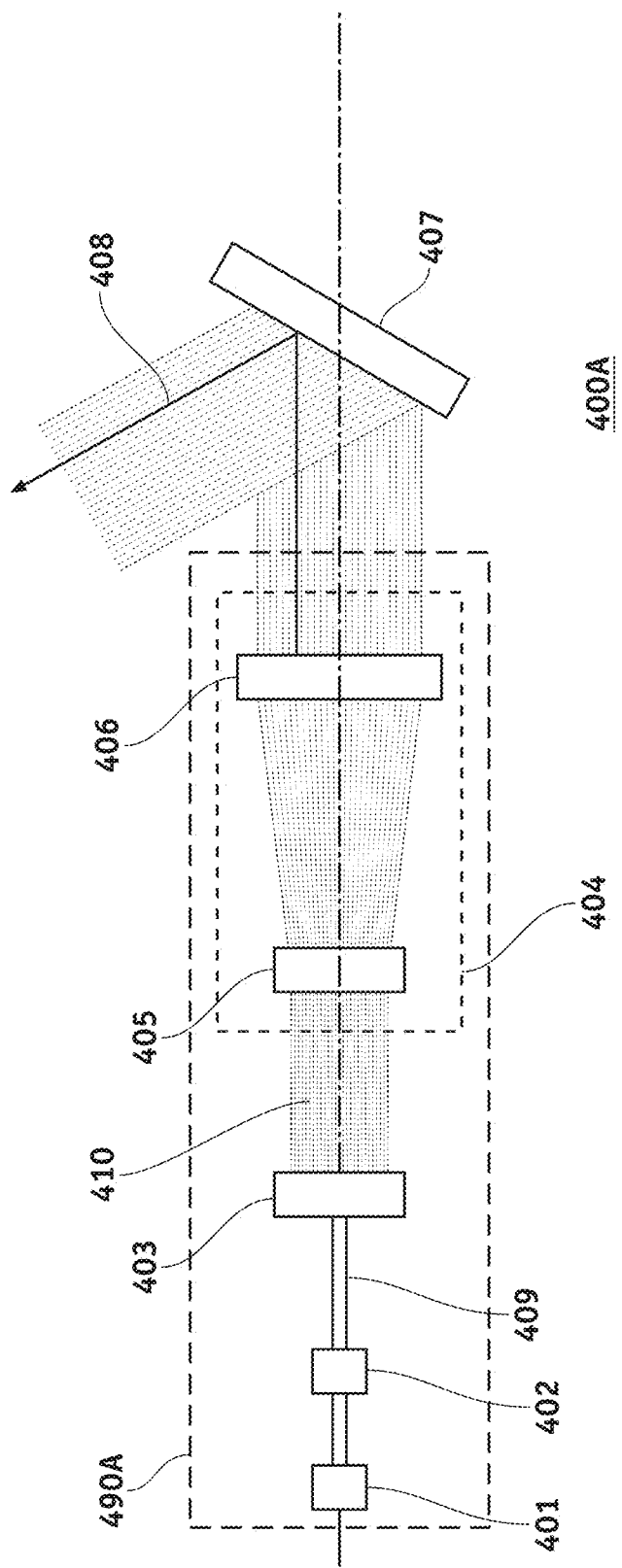
FIGS. 4A-4F and 5 show exemplary optical arrangements according to embodiments of the present disclosure.

FIG. 4A shows an exemplary optical arrangement (400A) according to an embodiment of the present disclosure. Optical arrangement (400A) comprises optical transmitter (490A) and steerable mirror (407). Optical transmitter (490A) may be implemented as the transmission part of, for example, transceiver optics within any of transceivers (101) of MLOTT (100) of FIG. 1. In the embodiment of FIG. 4A, optical transmitter (490A) comprises laser (401), transmit optical amplifier (402), collimator (403), and beam expander (404) including collimators (405, 406). The laser, transmit optical amplifier and collimator are connected via optical fiber (409). The transmit optical beam generated by laser (401), after being boosted by transmit optical amplifier (402), is collimated via collimator (403) and is radiated into free space. The free-space optical beam (410) is next passed through the optional beam expander (404). Beam expander (404) may be externally controlled and may expand the diameter of the beam in response to external commands (not shown). Beam expander (404) can expand the beam to several times the input beam diameter. After the optional beam expander, the optical beam impinges on the steerable mirror (407) where it is directed in the direction of the target (e.g. another MLOTT) as shown by arrow (408).

Figure 4B:
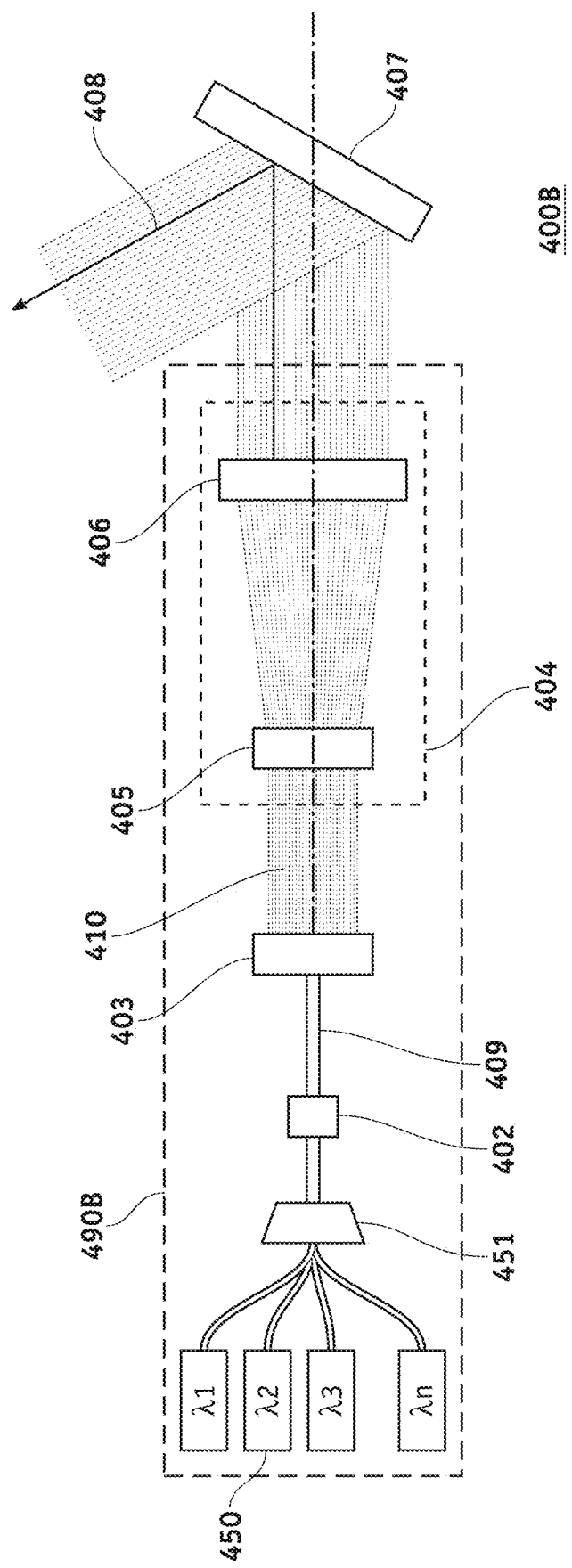

FIG. 4B shows an exemplary optical arrangement (400B) according to a further embodiment of the present disclosure. Optical arrangement (400B) comprises optical transmitter (490B) and steerable mirror (407). Also in this case, optical transmitter (490B) may be implemented as the transmission part of, for example, transceiver optics within any of transceivers (101) of MLOTT (100) of FIG. 1. The principle of operation of optical transmitter (490B) is similar to what was described with regards to optical transmitter (490A) of FIG. 4A, except that optical transmitter (490B) comprises a laser array (450), each laser of the array operating at a different wavelength, and an optical multiplexer (451). The laser array (450) generates several optical beams (each operating at a different wavelength) which are multiplexed into a single beam by multiplexer (451). Downstream of the multiplexer (451), the structure of this optical transmitter is similar to that of optical transmitter (490A) of FIG. 4A. As an example, a laser array including 12 lasers may be envisaged, wherein each laser may be modulated at 12 Gbps, so that the resulting transmission speed is 144 Gbps. Multiplexing several lasers as described above has the benefit of increasing the transmission speed by a factor equal to the number of lasers. Two or more lasers may be implemented depending on the application and/or requirements.

Figure 4C:
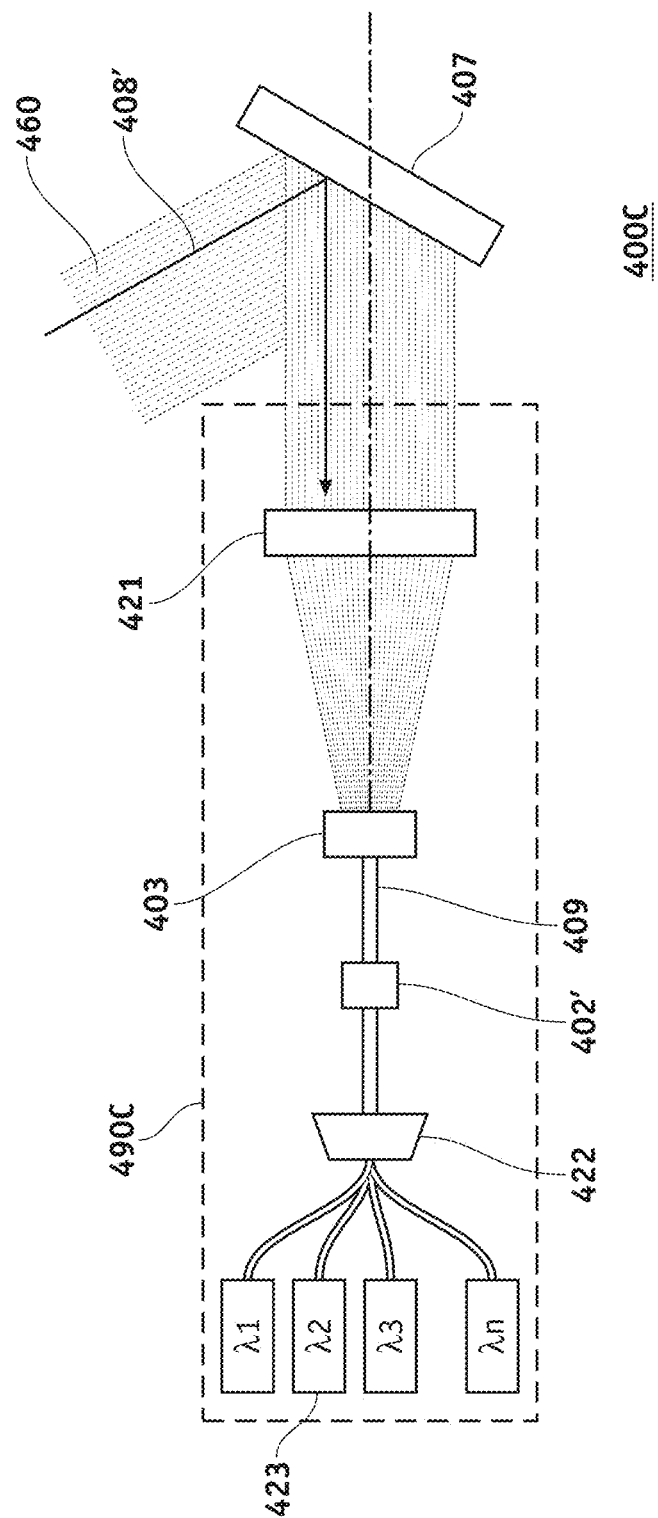

FIG. 4C shows an exemplary optical arrangement (400C) according to yet another embodiment of the present disclosure. Optical arrangement (400C) comprises optical receiver (490C) and steerable mirror (407). Optical receiver (490C) may be implemented as the receive part of, for example, transceiver optics within any of transceivers (101) of MLOTT (100) of FIG. 1. The incoming optical beam (460) is reflected by steerable mirror (407) and the reflected beam is then directed, in the direction shown by arrow (408'), towards collimator (403) after being focused by focusing lens (421). The optical beam is then injected into fiber (409) via collimator (403). The optical beam inside the fiber is then amplified via receive optical amplifier (402') and then directed towards demultiplexer (422). Demultiplexer (422) splits the optical beam into an array of optical beams (each optical beam operating at a distinct wavelength). Such separate optical beams are fed into the detector array (423) for signal demodulation. By using multiple wavelengths, an MLOTT implemented in accordance with the teachings of the present disclosure, could operate at speeds of 100s of gigabits per second.

Figure 4D:
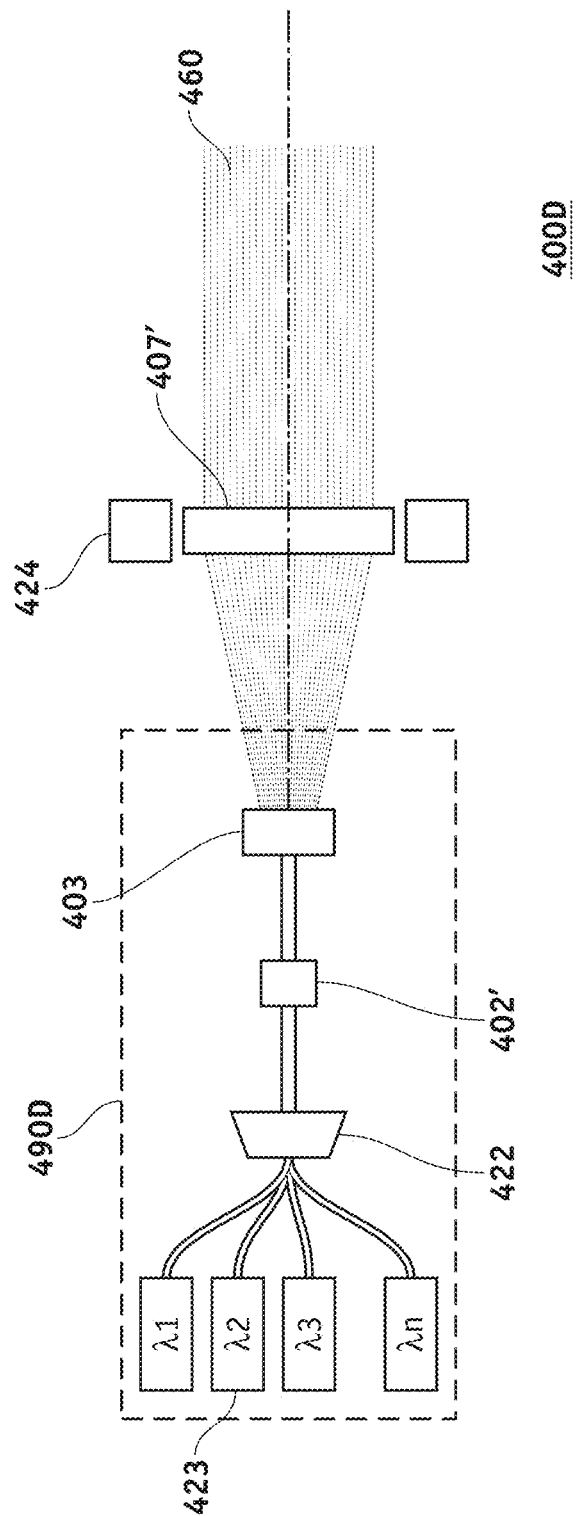

FIG. 4D shows an exemplary optical arrangement (400D) according to still another embodiment of the present disclosure. Optical arrangement (400D) comprises optical receiver (490D), focusing lens (407') and steering mechanism (424). Optical receiver (490D) may be implemented as the receive part of, for example, transceiver optics within any of transceivers (101) of MLOTT (100) of FIG. 1. The principle of operation of optical receiver (490D) is similar to what was described with regards to optical receiver (490C) of FIG. 4C, except that steerable mirror (407) is replaced by focusing lens (407') being steered using a steering mechanism (424), which may be a gimbal according to an embodiment of the present disclosure.

With reference to FIGS. 4B-4D, either of the optical receivers (400C, 400D) may be paired with the optical transmitter (400B) to implement, for example, any of the transceivers (101) of MLOTT (100) of FIG. 1. Such combination provides an exemplary MLOTT based on wavelength division multiplex (WDM) optical transceivers in accordance with the teachings of the present disclosure.

Figure 4E:
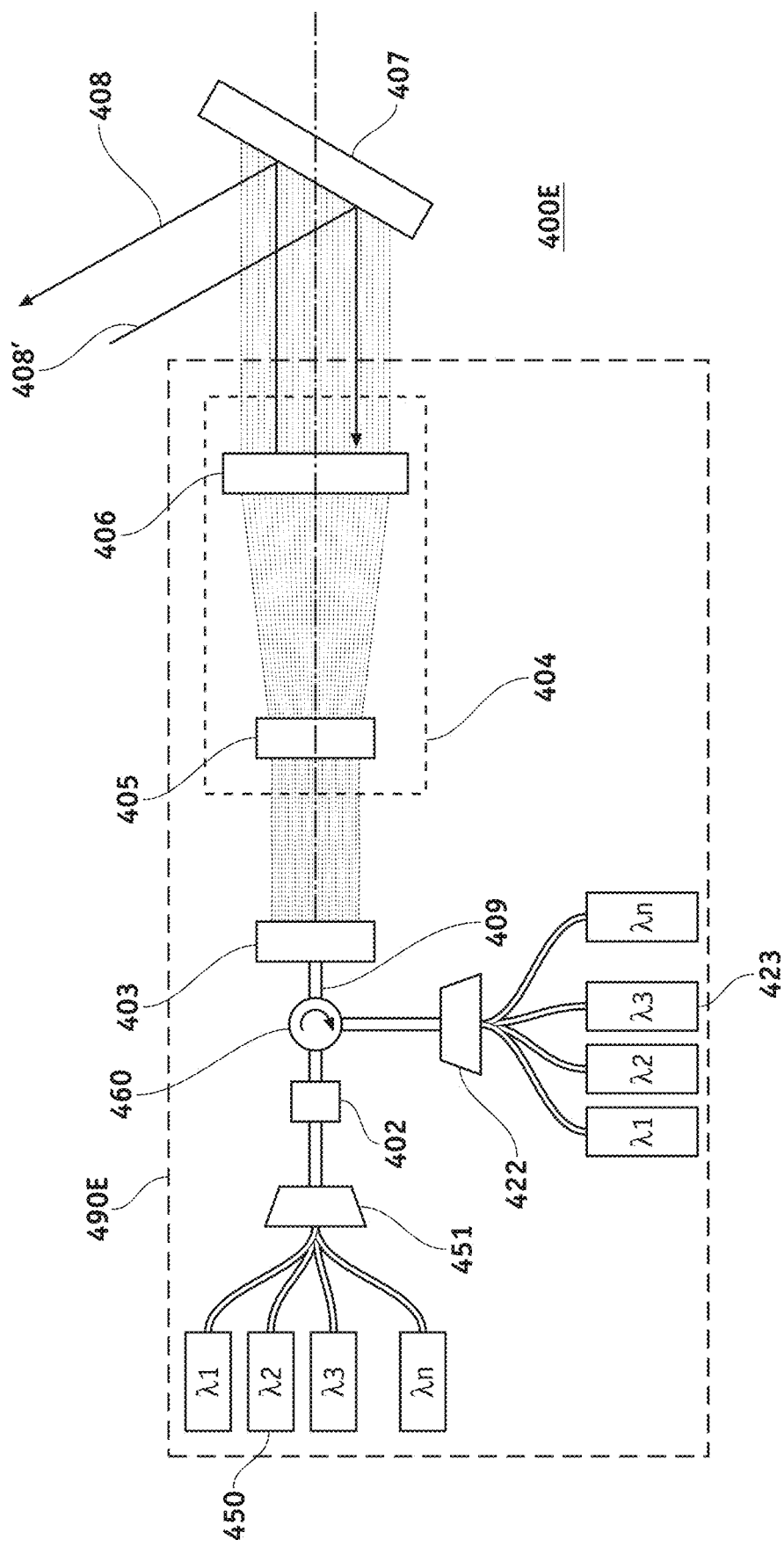

FIG. 4E shows an exemplary optical arrangement (400E) according to an additional embodiment of the present disclosure. Optical arrangement (400E) comprises optical transceiver (490E) and steerable mirror (407). Optical transceiver (490E) may be implemented as, for example, any of transceivers (101) of MLOTT (100) of FIG. 1. Optical transceiver (490E) comprises laser array (450) (operating at multiple wavelengths), multiplexer (451), optical amplifier (402), circulator (460), collimator (403), a beam expander (404) including collimators (405, 406), demultiplexer (422), and detector array (423). The laser array, multiplexer, optical amplifier and collimator are connected via optical fiber (409). Laser array (450) produces several optical beams (each operating at a different wavelength) which are combined into a single beam by the multiplexer (451). The multi-wavelength beam is then amplified by the optical amplifier (402) and collimated via the collimator (403) and radiated into free space. The free-space optical beam is next passed through the beam expander (404). After passing through the optional beam expander (404), the optical beam impinges on the steerable mirror (407) where it is directed in the direction of the desired target, as indicated by arrow (408).

With further reference to FIG. 4E, on the receive side, the incoming received beam is reflected by steerable mirror (407) and sent in the direction indicated by arrow (408') towards collimator (403) via the beam expander (404). The optical beam is then injected into fiber (409) via collimator (403) and directed towards demultiplexer (422) by circulator (460). Demultiplexer (422) splits the optical beam into several separate beams (each operating at a distinct wavelength). The separated optical beams are then fed into detector array (423) for signal demodulation.

FIG. 4E shows an exemplary optical arrangement (400F) according to an additional embodiment of the present disclosure. Optical arrangement (400E) comprises optical transceiver (490F) and steerable mirror (407). Optical transceiver (490F) may be implemented as, for example, any of transceivers (101) of MLOTT (100) of FIG. 1. Optical transceiver (490E) comprises laser (401), modulator (470), optical amplifier (402), circulator (460), collimator (403), and beam expander (404) including collimators (405, 406). Laser (401), modulator (470), optical amplifier (402), circulator (460) and collimator (403) are connected via optical fiber (409). Laser (401) generates a continuous wave (CW) optical beam which is phase modulated by the modulator (470). The modulated optical signal is then amplified by optical amplifier (402). The amplified signal is collimated via the collimator (403) and radiated into free space. The free-space optical beam is next passed through the beam expander (404). After the optional beam expander, the optical beam impinges on the steering mirror (407) where it is directed in the direction of the target as indicated by arrow (408).

Figure 4F:
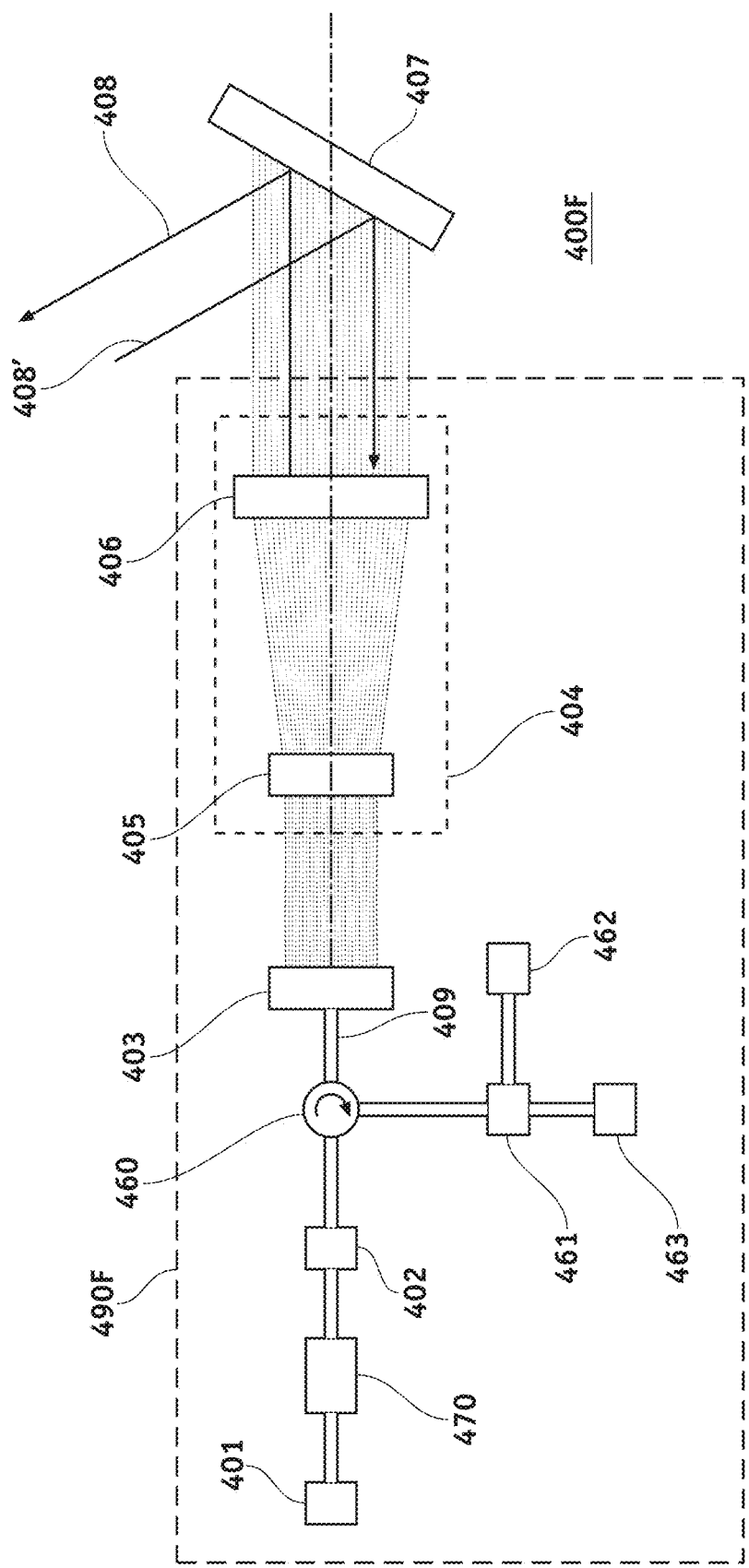

With reference to FIG. 4F, on the received side, the received beam is reflected by the mirror and sent in the direction indicated by arrow (408') towards the collimator (403) via the beam expander (404). The optical beam is then injected into fiber (409) via the collimator (403) and directed towards power combiner (461) by circulator (460). Power combiner (461) has the function of mixing the incoming beam with the signal generated by optical local oscillator (462). The resulting beam coming out of the power combiner is fed into coherent receiver (463) for signal demodulation. By virtue of implementing the described coherent transceiver, it is expected that the MLOTT could operate at speeds of terabits per second according to the teachings of the present disclosure.

Figure 5:
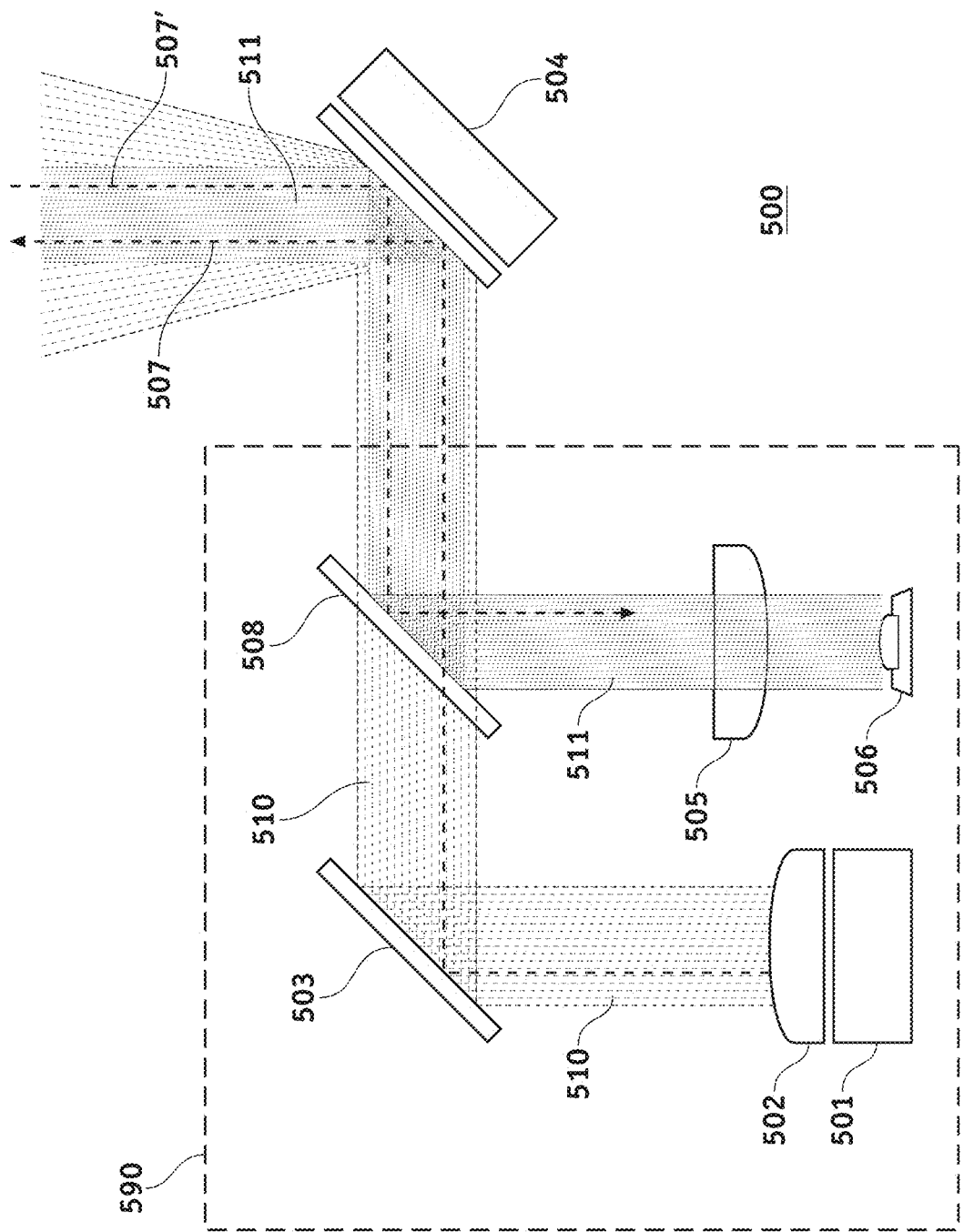

FIG. 5 shows an exemplary optical arrangement (500) according to an embodiment of the present disclosure. Optical arrangement (500) comprises optical transceiver (590) and steerable mirror (504). Optical transceiver (590) may be implemented as, for example, any of transceivers (101) of MLOTT (100) of FIG. 1. Optical transceiver (500) comprises laser (501), transmit collimator (502), fixed mirror (503), dichroic filter (508), receive focusing lens (505), and receive detector (506). The laser source in this embodiment may be a single laser or a laser array. In the scenario where a laser array is used, an optical multiplexer may be implemented between the laser and the laser array.

With continued reference to FIG. 5, during transmission, after being focused by passing through the collimator lens (502), the transmit optical beam (510) is reflected from the fixed mirror (503). The reflected beam then transits through dichroic filter (508). The transmit optical beam then impinges on the steerable mirror (504) where it is directed in the direction of the target. The transmit path direction is shown using arrow (507). On the receive side, the incoming optical beam (511) is reflected by steerable mirror (504). This is followed by a further reflection from dichroic filter (508), after which the reflected beam is passed through collimator (505) to be received by detector (506). In an embodiment where the laser source is a single laser, a single detector may be used. Otherwise, an optical demultiplexer after collimator and followed by a detector array may be implemented in the case where a wavelength-division multiplexing (WDM) scheme is adopted where a combination of a laser array together with an optical multiplexer are used on the transmit side. In an embodiment the detector comprises an avalanche photo-detector (APD).

With further reference to FIG. 5, optical transceiver (590) may be implemented for applications where the transmit and receive optical beams are selected from different wavelength ranges. Stated differently, the transmit optical beam (510) may be selected from a first wavelength range which is different from a second wavelength range from which the received optical beam (511) is selected from. In this scenario, the dichroic filter (508) is designed to selectively pass the transmit optical beam within the first wavelength range while reflecting the optical beam within the second wavelength range.

Figure 6:
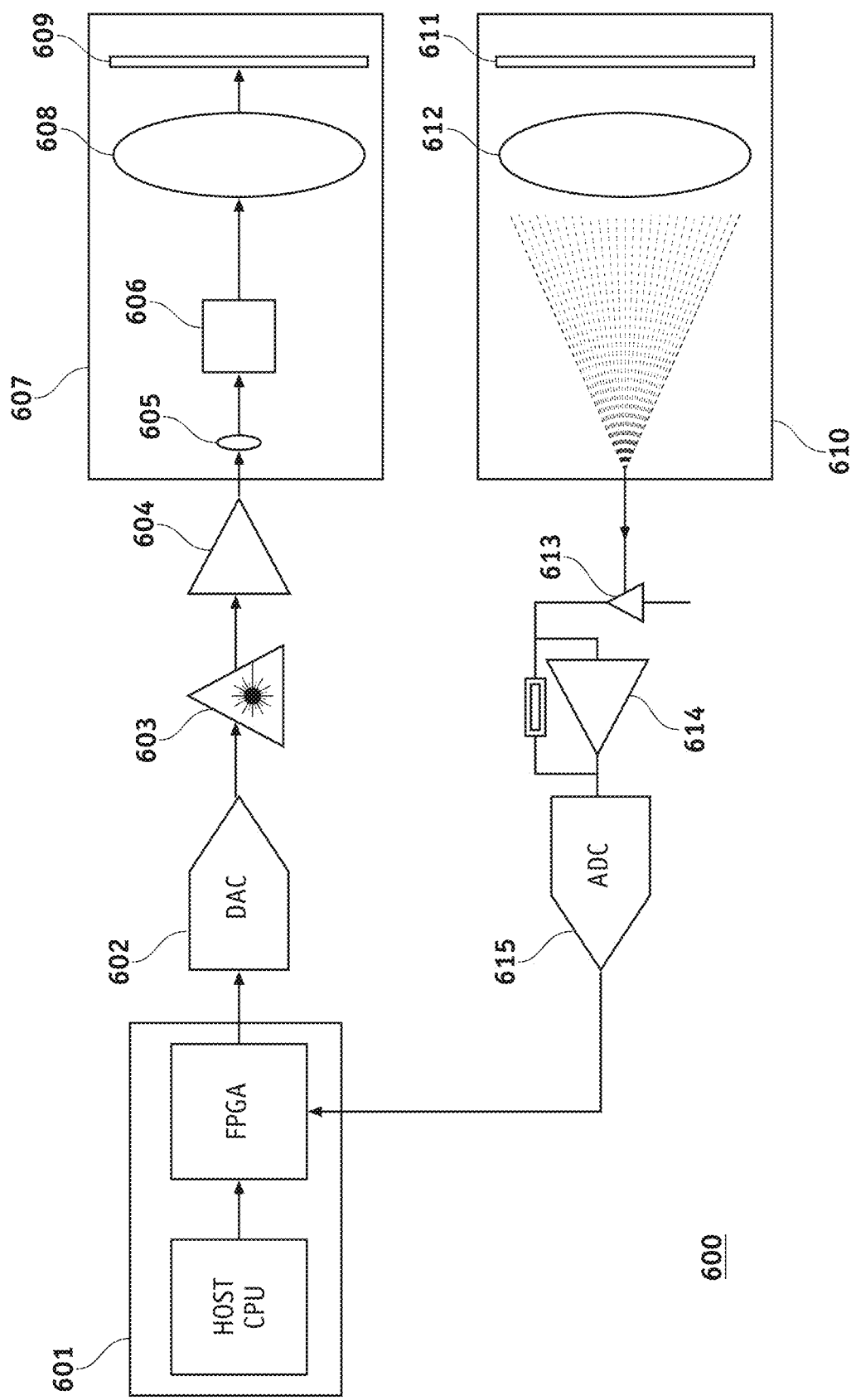
FIG. 6 shows the system level block diagram of an exemplary transmission system according to an embodiment of the present disclosure.

FIG. 6 shows a system level block diagram of an exemplary transmission system (600) according to an embodiment of the present disclosure. This transmission system comprises a control and processing unit (601), digital to analog converter (DAC) (602), laser (603), optical amplifier (604), transmit telescope (607), receive telescope (610), optical detector (613), transimpedance amplifier (TIA) (614) and analog to digital converter (615). Transmit telescope (607) comprises collimator (605), FSM (606), window (608), and optical filter (609). Optional window (608) is transparent to the beam and is used for physical protection of the FSM (606). It is also can be coated with filter (609) Receive telescope (610) comprises optical filter (611), and focusing lens (612).

With continued reference to FIG. 6, control and processing unit (601) includes a processor and an FPGA that have the role of overall control of the system, such as controlling the laser (602) and FSM (606), and processing input information and calculating, for example, the angle of arrival to be able to steer the FSM (606) towards the desired and correct orientation for transmission. On the transmit side, the transmit beam generated by the laser is amplified through optical amplifier (604), then collimated via collimator (605). The collimated optical beam is then reflected from FSM (606) and passed through window (608) and optical filter (609) to be free-space propagated towards the target in a desired direction. Upstream from collimator (605) the transmission may be through a fiber and downstream from collimator (605), the transmission is free-space transmission.

With further reference to FIG. 6, the optical beam received by the receive telescope (610) is passed through optical filter (611) and focusing lens (612) to focus on a focal plane where the beam is detected by optical detector (613). The resulting analog electronic signal is then amplified via TIA (614) before being digitized by ADC (615). The resulting digital information is then communicated with control and processing unit (601) for further processing.

Figure 7:
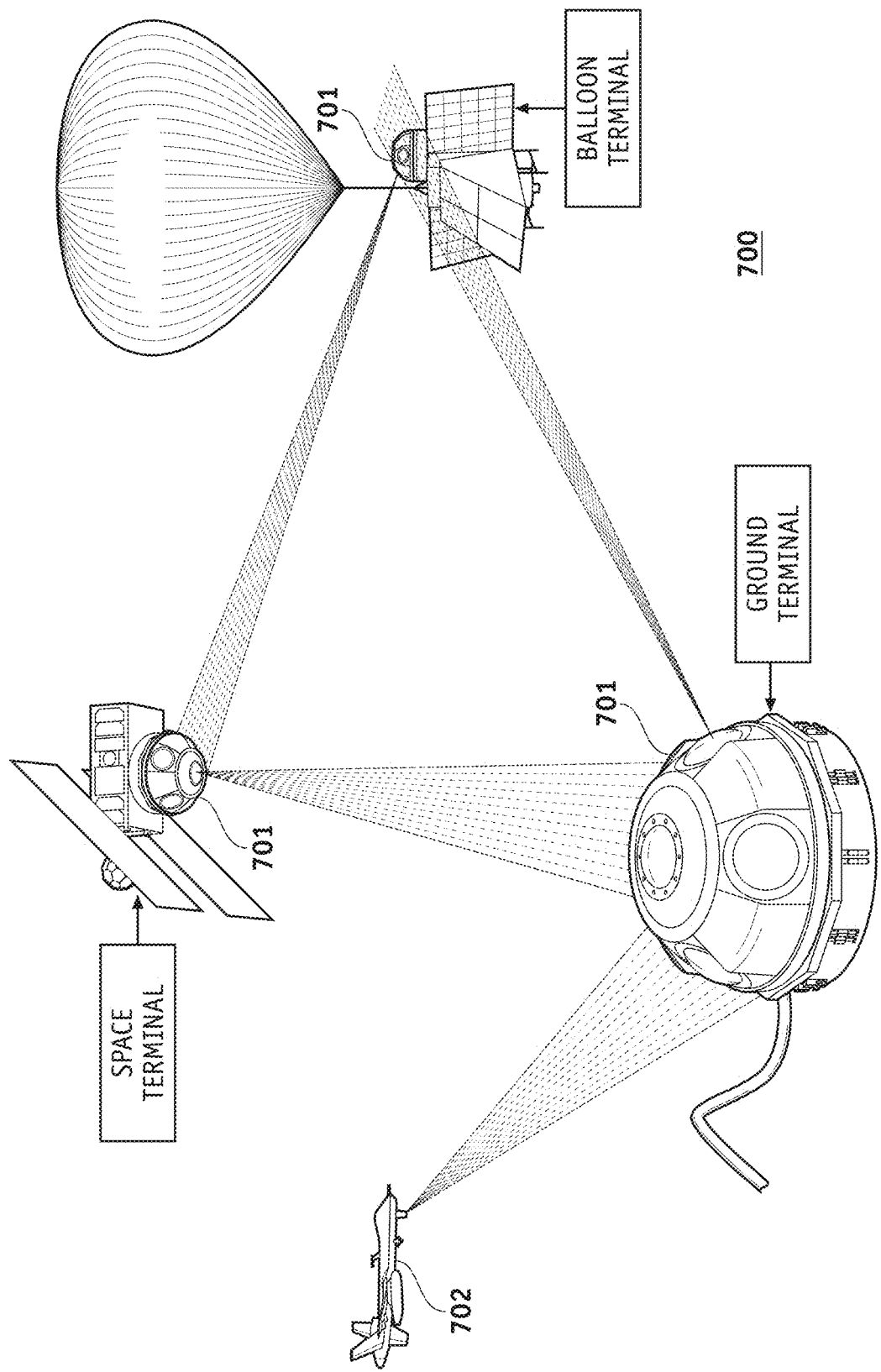
FIG. 7 shows an exemplary ground-air-space network according to an embodiment of the present disclosure.

FIG. 7 shows an exemplary ground-air-space network (700) enabled by MLOTTs (701) according to an embodiment of the present disclosure. Such network can function in terabits/sec transmission rates. As shown MLOTTs (701) are being implemented as ground, balloon or space terminals. In addition, communication with airplanes (702) can also be established within such network.

In summary, the disclosed terminals provide the following benefits over the existing technologies:
- The use of large steerable apertures (e.g., from 2-inch to 10-inch in diameter) in combination with multiple-wavelength optical beams, yields near terabit operation at distances of up to thousands of kilometers.
- Comparing with other RF or laser communications systems the described MLOTTs allow up to terabit per second data transfer in all directions. This is achieved by virtue of implementing multifaceted structures including large steerable apertures, and using, as an example, WDM schemes and arrays of lasers and detectors.
- Multiple (e.g. 2-6 or higher number of) links can be maintained simultaneously.
- The data rates allowed by the MLOTT are 2-4 orders of magnitude higher than any current data transfer technology based on optical or radio-frequency transceivers.
- The described MLOTTs feature a modular and versatile architecture suitable for use in multiple types of platforms including spacecraft, rovers, landers and ground stations, as well as network and terrestrial applications.

The invention claimed is:

1. A multiple-link optical terabit terminal (MLOTT) comprising:
A1) a multifaceted structure including a plurality of facets arranged in a geometry to provide an omnidirectional coverage, wherein each facet comprises:
a1) a transceiver configured to transmit and receive optical beams, the transceiver comprising an optical fiber and an optical transmitter, the optical transmitter comprising a laser and a collimator, a2) angle-of-arrival detectors configured to receive an incoming optical beam, and
a3) a steerable aperture including a steerable mirror;
A2) a control and processing unit,
A3) an optical amplifier disposed between the laser and the collimator, and
A4) a beam expander disposed between the collimator and the steerable mirror;
wherein
B1) a combination of the angle-of-arrival detectors and the control and processing unit is configured to calculate an angle of arrival of the incoming optical beam and, prior to a transmission, to steer the steerable aperture accordingly;
B2) in a transmission state of the transceiver:
  b1) the laser is configured to generate a transmit optical beam into the optical fiber;
  b2) the collimator is configured to collimate the transmit optical beam out of the optical fiber, into a free space, to generate a collimated optical beam travelling in a direction towards the steerable mirror; and
  b3) the steerable mirror is configured to reflect the collimated optical beam into a direction based on the angle of arrival,
B3) the optical amplifier is configured to amplify the transmit optical beam; and
B4) the beam expander is configured to expand the collimated optical beam before being reflected by the steerable mirror.

2. The MLOTT of claim 1, wherein the steerable aperture comprises a lens.

3. The MLOTT of claim 1, further comprising a receive focusing lens, a detection system disposed in a focal plane of the receive focusing lens, and a mechanical actuator, and wherein a combination of the receive focusing lens and the steerable mirror are held by the mechanical actuator.

4. The MLOTT of claim 3, wherein the mechanical actuator comprises a gimbal.

5. The MLOTT of claim 3, wherein:
the detection system comprises an optical fiber with an end disposed at the focal plane of the receive focusing lens;
the receive focusing lens is configured to focus the incoming optical beam at the focal plane, and the optical fiber is configured to receive and guide the incoming optical beam.

6. The MLOTT of claim 3, wherein the detection system comprises one or more optical detectors.

7. The MLOTT of claim 6, wherein each transceiver includes receive electronics, the receive electronics:
comprising a transimpedance amplifier and an analog to digital converter, and
coupling an optical detector of the one or more optical detectors to the control and processing unit.

8. The MLOTT of claim 1, further comprising a mechanical actuator holding the steerable mirror.

9. The MLOTT of claim 8, wherein the mechanical actuator comprises a gimbal.

10. The MLOTT of claim 1, wherein the incoming optical beam is a multiplexed optical beam having a plurality of wavelengths, and wherein the transceiver comprises a receive focusing lens, an optical demultiplexer, and a plurality of detectors, and wherein:
in a reception state:
  the steerable mirror is configured to reflect the incoming optical beam to generate a reflected beam and to direct the reflected beam towards the receive focusing lens;
  the receive focusing lens is configured to focus the reflected beam onto the collimator;
  the collimator is configured to collimate the reflected beam to generate a collimated incoming optical beam into the optical fiber;
  the optical amplifier is configured to amplify the collimated incoming optical beam to generate an amplified incoming optical beam, and to direct the amplified incoming optical beam to the optical demultiplexer;
  the optical demultiplexer is configured to demultiplex the amplified incoming optical beam into a plurality of received optical beams, each received optical beam having a corresponding wavelength of the plurality of wavelengths; and
  the plurality of detectors are configured to detect corresponding plurality of received optical beams.

11. A ground-air-space network, comprising a ground station, a space station, a balloon, and an airplane, wherein one or more of the ground station, space station or the balloon comprise the MLOTT of claim 1.

12. A multiple-link optical terabit terminal (MLOTT) comprising:
A1) a multifaceted structure including a plurality of facets arranged in a geometry to provide an omnidirectional coverage, wherein each facet comprises:
  a1) a transceiver configured to transmit and receive optical beams, the transceiver comprising an optical fiber, a plurality of lasers having different wavelengths, an optical multiplexer, an optical demultiplexer, a plurality of detectors, a circulator and a collimator,
  a2) angle-of-arrival detectors configured to receive an incoming optical beam, and
  a3) a steerable aperture including a steerable mirror;
A2) a control and processing unit;
wherein
B1) a combination of the angle-of-arrival detectors and the control and processing unit is configured to calculate an angle of arrival of the incoming optical beam and, prior to a transmission, to steer the steerable aperture accordingly;
B2) the incoming optical beam is a multiplexed received optical beam;
B3) in a transmission state:
  each laser of the plurality of lasers is configured to generate a transmit optical beam;
  the optical multiplexer is configured to multiplex the optical beams to generate a multiplexed transmit optical beam into the optical fiber;
  the circulator is configured to direct the multiplexed transmit optical beam toward the collimator;
  the collimator is configured to collimate the multiplexed transmit optical beam out of the optical fiber, into a free space, to generate a collimated transmit beam travelling in a direction towards the steerable mirror; and
  the steerable mirror is configured to reflect the collimated transmit beam into a direction based on the angle of arrival, B4) in a reception state:
the steerable mirror is configured to reflect the incoming optical beam to generate a reflected beam and to direct the reflected beam onto the collimator;
the collimator is configured to collimate the reflected beam to generate a collimated optical beam into the optical fiber;
the circulator is configured to direct the collimated optical beam towards the optical demultiplexer;
the optical demultiplexer is configured to demultiplex the collimated optical beam into a plurality of received optical beams, each received optical beam having a corresponding wavelength of the plurality of wavelengths; and
the plurality of detectors are configured to detect corresponding plurality of received optical beams.

13. A multiple-link optical terabit terminal (MLOTT) comprising:
A1) a multifaceted structure including a plurality of facets arranged in a geometry to provide an omnidirectional coverage, wherein each facet comprises:
a1) a transceiver configured to transmit and receive optical beams, the transceiver comprising a laser, an optical phase modulator, an optical amplifier, a circulator, an optical fiber, a collimator, a power combiner, an optical oscillator, and a coherent receiver,
a2) angle-of-arrival detectors configured to receive an incoming optical beam, and
a3) a steerable aperture including a steerable mirror;
A2) a control and processing unit;
wherein
B1) a combination of the angle-of-arrival detectors and the control and processing unit is configured to calculate an angle of arrival of the incoming optical beam and, prior to a transmission, to steer the steerable aperture accordingly;
B2) in a transmission state:
the laser is configured to generate a transmit optical beam into the optical fiber;
the modulator is configured to modulate the transmit optical beam to generate a modulated transmit optical beam;
the circulator is configured to direct the modulated transmit optical beam toward the collimator;
the collimator is configured to collimate the modulated transmit optical beam out of the optical fiber, into a free space, to generate a collimated transmit beam travelling in a direction towards the steerable mirror; and
the steerable mirror is configured to reflect the collimated transmit beam into a direction based on the angle of arrival, and
B3) in a reception state:
the steerable mirror is configured to reflect the incoming optical beam to generate a reflected beam and to direct the reflected beam onto the collimator;
the collimator is configured to collimate the reflected beam to generate a collimated optical beam into the optical fiber;
the circulator is configured to direct the collimated optical beam towards the power combiner;
the optical oscillator is configured to generate a local oscillator signal;
the power combiner is configured to mix the local oscillator signal with the collimated optical beam to generate a mixed optical beam, and
the coherent receiver is configured to demodulate the mixed optical beam.

14. A multiple-link optical terabit terminal (MLOTT) comprising:
A1) a multifaceted structure including a plurality of facets arranged in a geometry to provide an omnidirectional coverage, wherein each facet comprises:
a1) a transceiver configured to transmit and receive optical beams, the transceiver comprising a laser, a collimator, a fixed mirror, a dichroic filter, a receive focusing lens, and a receive detector,
a2) angle-of-arrival detectors configured to receive an incoming optical beam, and
a3) a steerable aperture including a steerable mirror;
A2) a control and processing unit;
wherein
B1) a combination of the angle-of-arrival detectors and the control and processing unit is configured to calculate an angle of arrival of the incoming optical beam and, prior to a transmission, to steer the steerable aperture accordingly;
B2) the incoming optical beam has a first wavelength;
B3) in a transmit state:
the MLOTT is configured to generate a transmit optical beam having a second wavelength, the second wavelength being different from the first wavelength;
the collimator is configured to collimate the transmit optical beam to generate a collimated transmit optical beam;
the fixed mirror is configured to reflect the collimated transmit optical beam to direct the collimated transmit optical beam towards the dichroic filter;
the dichroic filter is configured to pass-through the collimated transmit optical beam to direct the collimated transmit optical beam towards the steerable mirror; and
the steerable mirror is configured to reflect the collimated transmit optical beam and transmit the collimated transmit optical beam into a desired direction based on the angle of arrival;
B4) in a reception state:
the steerable mirror is configured to reflect the incoming optical beam to generate a first reflected optical beam;
the dichroic filter is configured to reflect the first reflected optical beam to generate a second reflected optical beam; and
the receive focusing lens is configured to focus the second reflected optical beam onto the receive detector.

15. A multiple-link optical terabit terminal (MLOTT) comprising:
A1) a multifaceted structure including a plurality of facets arranged in a geometry to provide an omnidirectional coverage, wherein each facet comprises:
a1) a transceiver configured to transmit and receive optical beams, the transceiver comprising an optical fiber and an optical transmitter, the optical transmitter comprising a plurality of lasers having different wavelengths, an optical multiplexer, and a collimator,
a2) angle-of-arrival detectors configured to receive an incoming optical beam, and
a3) a steerable aperture including a steerable mirror;
A2) a control and processing unit;
A3) an optical amplifier disposed between the optical multiplexer and the collimator, and A4) a beam expander disposed between the collimator and the steerable mirror;

wherein

B1) a combination of the angle-of-arrival detectors and the control and processing unit is configured to calculate an angle of arrival of the incoming optical beam and, prior to a transmission, to steer the steerable aperture accordingly;

B2) in a transmission state of the transceiver:
  b1) each laser of the plurality of lasers is configured to generate a transmit optical beam into the optical fiber;
  b2) the optical multiplexer is configured to multiplex the optical beams to generate a multiplexed optical beam into the optical fiber;
  b2) the collimator is configured to collimate the multiplexed optical beam out of the optical fiber, into a free space, to generate a collimated optical beam travelling in a direction towards the steerable mirror; and
  b3) the steerable mirror is configured to reflect the collimated optical beam into a direction based on the angle of arrival, B3) the optical amplifier is configured to amplify the multiplexed optical beam; and B4) the beam expander is configured to expand the collimated optical beam before being reflected by the steerable mirror.

\* \* \* \* \*